US008972110B2

(12) United States Patent
Kim

(10) Patent No.: US 8,972,110 B2
(45) Date of Patent: Mar. 3, 2015

(54) METHOD FOR GENERATING REQUEST COMMAND OF WHEEL ALIGNMENT APPARATUS USING MOTOR-DRIVEN POWER STEERING

(75) Inventor: Jeong Ku Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 21 days.

(21) Appl. No.: 13/556,879

(22) Filed: Jul. 24, 2012

(65) Prior Publication Data

US 2013/0103261 A1  Apr. 25, 2013

(30) Foreign Application Priority Data

Oct. 24, 2011 (KR) .................. 10-2011-0108935

(51) Int. Cl.
*B62D 6/00* (2006.01)
*B62D 15/02* (2006.01)

(52) U.S. Cl.
CPC .................................. *B62D 15/027* (2013.01)
USPC .......................................... 701/41; 340/932.2

(58) Field of Classification Search
USPC .................. 701/41, 408; 310/309; 340/932.2; 348/118
See application file for complete search history.

(56) References Cited

U.S. PATENT DOCUMENTS

| | | | |
|---|---|---|---|
| 2002/0175832 A1* | 11/2002 | Mizusawa et al. | 340/932.2 |
| 2006/0214535 A1* | 9/2006 | Salmon | 310/309 |
| 2007/0078594 A1* | 4/2007 | Mori | 701/207 |
| 2009/0112404 A1* | 4/2009 | Imura et al. | 701/41 |
| 2009/0259365 A1* | 10/2009 | Rohlfs et al. | 701/41 |
| 2010/0085427 A1* | 4/2010 | Cheng et al. | 348/118 |
| 2011/0199236 A1* | 8/2011 | Hauber | 340/932.2 |
| 2011/0260887 A1* | 10/2011 | Toledo et al. | 340/932.2 |

* cited by examiner

*Primary Examiner* — Tuan C. To
*Assistant Examiner* — Yuri Kan
(74) *Attorney, Agent, or Firm* — Saliwanchik, Lloyd & Eisenschenk

(57) ABSTRACT

The present invention relates to a method for generating a request command of a wheel alignment apparatus using a motor-drive power steering (MDPS). After a vehicle having the MDPS mounted therein is parked, a steering angle is detected, and an MDPS motor is controlled through a request command of a motor angular velocity to align a wheel with the center. Accordingly, the motor angular velocity of the motor which is actually driven may be controlled to improve the precision of motor control, regardless of external disturbance such as tire frictions or loads.

5 Claims, 3 Drawing Sheets

METHOD FOR GENERATING REQUEST COMMAND OF WHEEL ALIGNMENT APPARATUS USING MOTOR-DRIVEN POWER STEERING

CROSS-REFERENCE TO RELATED APPLICATION

This application claims the benefit under 35 U.S.C. 119 of Korean Patent Application No. 10-2011-0108935, filed Oct. 24, 2011, which is hereby incorporated by reference in its entirety.

BACKGROUND

Exemplary embodiments of the present invention relate to a method for generating a request command of a wheel alignment apparatus using a motor-driven power steering (MDPS), and more particularly, to a method for generating a request command of a wheel alignment apparatus using an MDPS, which detects a steering angle and generates a request command for aligning a wheel with the center, after a vehicle having the MDPS therein is parked.

Examples of an electronic control unit (ECU) which is generally applied to a vehicle may include an MDPS which reduces a manipulation force of a steering wheel according to the speed of the vehicle such that a steering manipulation may be softly and quickly performed.

The MDPS is operated as follows. First, the ECU receives input signals from a steering angle sensor, a torque sensor, a vehicle speed sensor, and an engine RPM sensor, calculates a current value corresponding to a torque value, and supplies the calculated current value to an MDPS motor, when the steering wheel is steered. Then, the MDPS motor generates a power assist force through rotations and deceleration so as to rotate a universal joint, and operates a pinion and rack using the rotational power of the universal joint such that the steering wheel is steered through a tie rod. Accordingly, the MDPS has steering performance and feeling which are improved more than a hydraulic power steering.

In this connection, Korean Patent Laid-open Publication No. 10-2010-0007321 discloses a wheel alignment apparatus of a motor-driven power steering vehicle.

Although the above-described MDPS is used, a driver may feel inconvenient when performing center alignment of the steering wheel after parking the vehicle. When the driver starts the vehicle in a state where the center alignment is not carried out, a vehicle collision is likely to occur.

BRIEF SUMMARY

An embodiment of the present invention relates to a method for generating a request command of a wheel alignment apparatus using an MDPS, which detects a steering angle and generates a request command for aligning a wheel with the center, after a vehicle having the MDPS therein is parked.

In one embodiment, there is provided a method for generating a request command of a wheel alignment apparatus using a motor-drive power steering (MDPS). The method includes: setting, by the request value generation unit, an initial value of a request command basic design function, when an activation command is inputted according to an input of an activation switch; receiving an initial steering angle through a steering angle sensor after setting the initial value; setting a control period divided into an angular velocity acceleration period, a constant angular velocity period, and an angular velocity deceleration period from the initial steering angle, in order to align the wheel with the center; and generating a request profile according to the control period.

The request command profile in the constant angular velocity period may be generated as the maximum angular velocity.

The angular velocity acceleration period and the angular velocity deceleration period may be generated as the same request command profile.

When a steering angle is insufficient in the angular velocity acceleration period and the angular velocity deceleration period, a loop of an angular velocity period for steering the steering angle may be repeated.

The request command basis design function may include a function substituted for a loop number with respect to time.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION

Hereinafter, embodiments of the present invention will be described with reference to accompanying drawings. However, the embodiments are for illustrative purposes only and are not intended to limit the scope of the invention.

Figure 1:
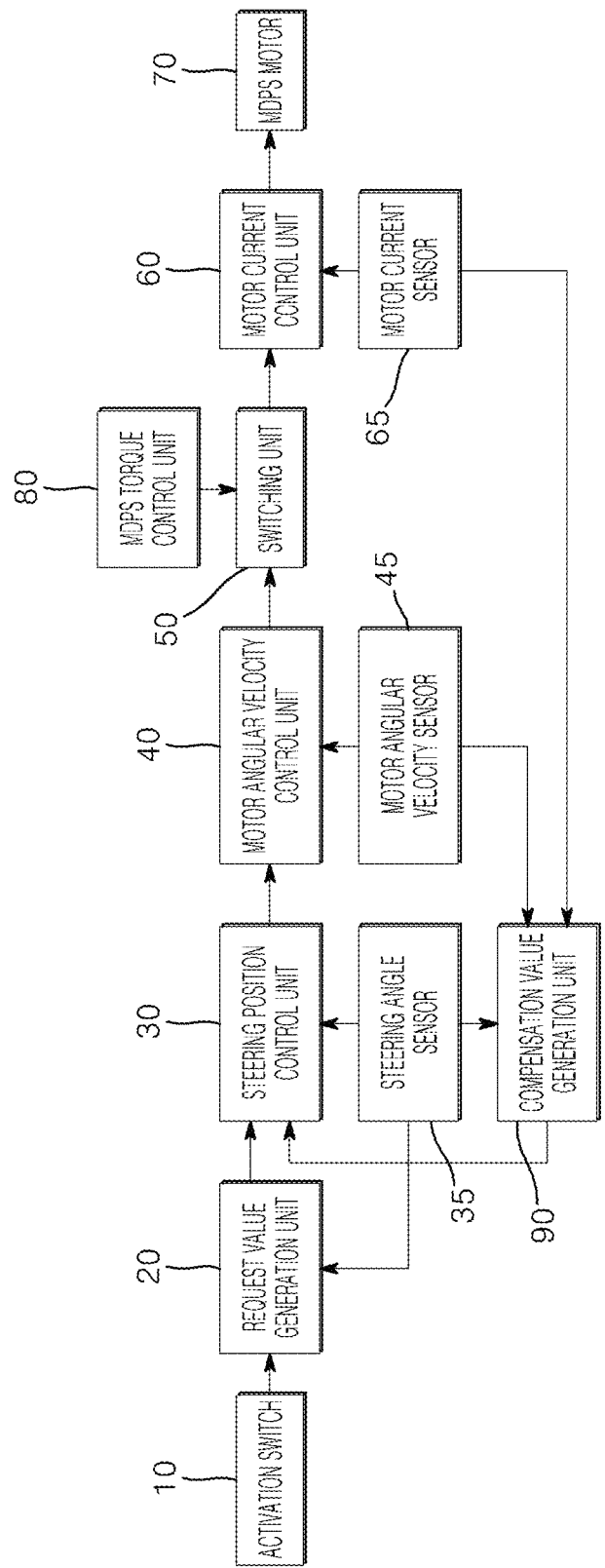
FIG. 1 is a block diagram illustrating a wheel alignment apparatus using an MDPS in accordance with an embodiment of the present invention.

FIG. 1 is a block diagram illustrating a wheel alignment apparatus using an MDPS in accordance with an embodiment of the present invention.

Referring to FIG. 1, the wheel alignment apparatus in accordance with the embodiment of the present invention includes a request value generation unit 20, a steering position control unit 30, a motor angular velocity control unit 40, a motor current control unit 60, an activation switch 10, a switching unit 50, an MDPS motor 70, an MDPS torque control unit 80, and a compensation value generation unit 90.

The request value generation unit 20 generates a request profile for center alignment according to a steering angle inputted from the steering angle sensor 35, when receiving an activation command for aligning a wheel of a vehicle having an MDPS mounted therein with the center.

At this time, the activation command is generated when a driver activates the activation switch 10 to align the wheel with the center after parking the vehicle.

Furthermore, the activation command is outputted only when the vehicle is determined to be parked, even though the activation switch 10 is activated.

Whether the vehicle is parked or not may be determined according to a typical method.

That is, the parking state of the vehicle is determined by checking whether or not a gear is shifted to P position in a state where the vehicle is stopped, or determined based on the open degree of a throttle valve, an engine RPM, the operation state of a brake and the like.

The steering position control unit 30 calculates a target steering angular velocity for center alignment through the request profile generated by the request value generation unit 20 and the steering angle inputted from the steering angle sensor 35, and converts the target steering angular velocity into a motor angular velocity.

Furthermore, the compensation value generation unit 90 generates a compensation profile using values inputted through the steering angle sensor 35, a motor angular velocity sensor 45, and a motor current sensor 65, and adds up the generated compensation profile and the request profile generated by the request value generation unit 20 to compensate for the request profile, thereby minimizing an effect caused by external disturbance.

The compensation value generation unit 90 adds the compensation profile and the request profile generated by the request value generation unit 20 using the steering angle, the steering angular velocity or motor angular velocity, and the motor current variation, in order to compensate for the request profile.

As such, the compensation value generation unit 90 periodically outputs a compensation profile through a learning process to estimate a compensation value while monitoring the steering angle, the motor angular velocity, and the motor current, and the steering position control unit 30 compensates for the request profile by adding up the request profile generated by the request value generation unit 20 and the compensation profile generated by the compensation value generation unit 90, and calculates the target steering angular velocity for center alignment through the steering angle inputted from the steering angle sensor 35.

The motor angular velocity control unit 40 generates a driving current for driving the MDPS motor 70 through the motor angular velocity inputted from the steering position control unit 30 and the motor angular velocity inputted from the motor angular velocity sensor 45.

The motor current control unit 60 compares the driving current generated by the motor angular velocity control unit 40 to the motor current measured by the motor current sensor 65, and drives the MDPS motor 70.

Furthermore, the wheel alignment apparatus using MDPS in accordance with the embodiment of the present invention further includes the switching unit 50 which selectively switches a driving current outputted from the MDPS torque control unit 80 and the driving current generated from the motor angular velocity control unit 40, and supplies the driving current to the motor current control unit 60.

That is, the MDPS torque control unit 80 outputs a driving current for generating a power assist force according to a steering intention, when the driver steers the steering wheel.

Therefore, when a driver's steering intention is detected, the driving current outputted from the MDPS torque control unit 80 is switched by the switching unit 50 and inputted to the motor current control unit 60 to drive the MDPS motor 70 according to the driver's steering intention.

Figure 2:
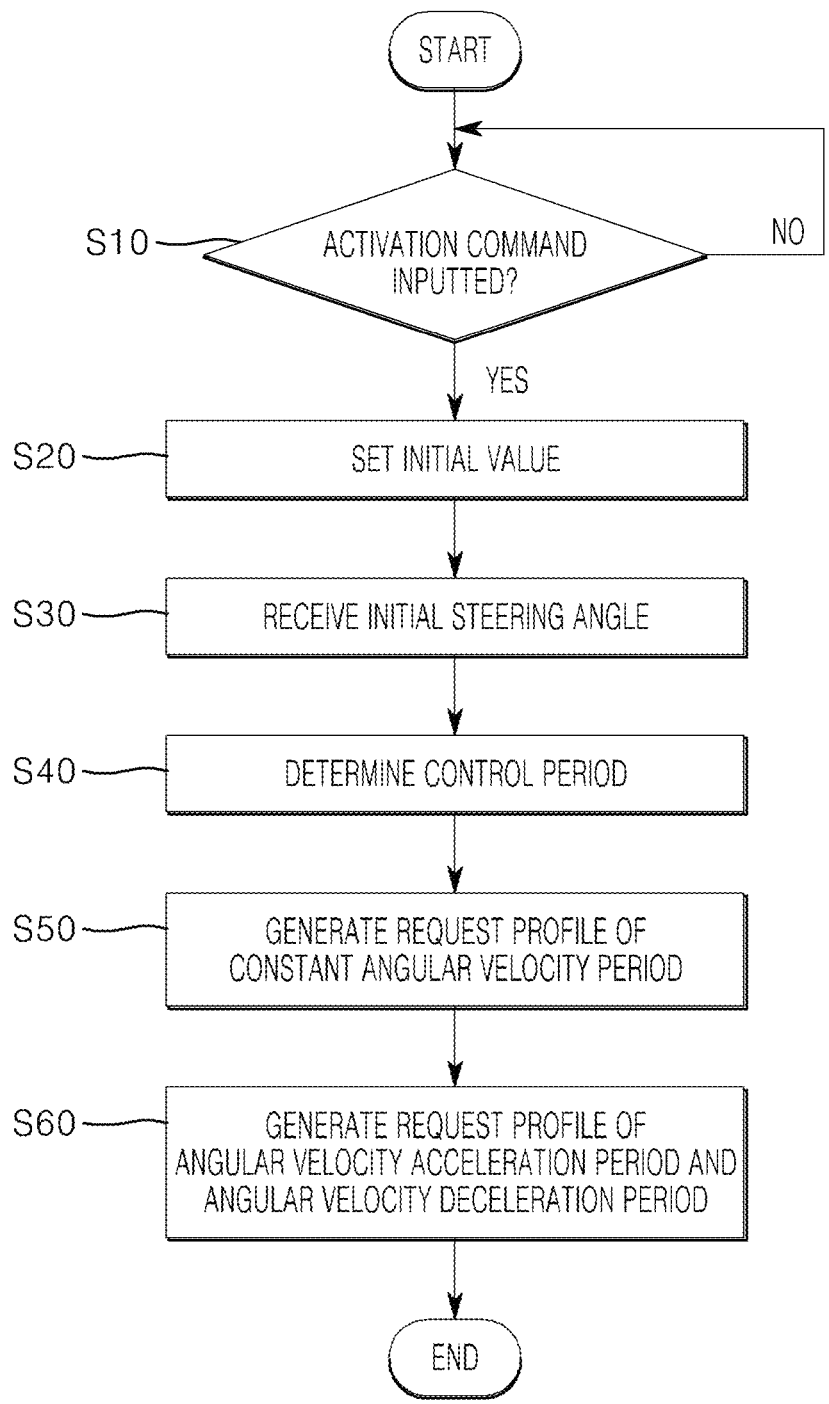
FIG. 2 is a flow chart explaining a method for generating a request command of a wheel alignment apparatus using an MDPS in accordance with an embodiment of the present invention.
Figure 3:
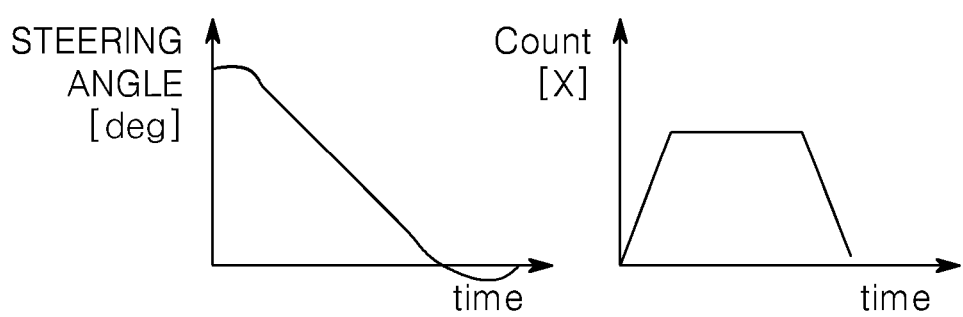
FIG. 3 is a graph showing a request profile of the wheel alignment apparatus using an MDPS in accordance with the embodiment of the present invention.

FIG. 2 is a flow chart explaining a method for generating a request command of a wheel alignment apparatus using MDPS in accordance with an embodiment of the present invention. FIG. 3 is a graph showing a request profile of the wheel alignment apparatus using MDPS in accordance with the embodiment of the present invention.

First, the request value generation unit 20 determines whether an activation command for center alignment is inputted or not, at step S10.

At this time, the activation command is generated when a driver activates the activation switch 10 to align the wheel with the center. In particular, the activation command is generated only when the vehicle is parked.

The parking state may be determined by checking whether or not a gear is shifted to P position in a state where the vehicle is stopped, or determined based on the open degree of the throttle valve, an engine RPM, the operation state of the brake and the like.

Then, the request value generation unit 20 sets an initial value of a request command basic design function at step S20.

The request command basic design function is designed to generate a request profile as shown in FIG. 3.

For example, an angular acceleration may be defined as $\ddot{y}=a=1500$, an angular velocity may be defined as $\dot{y}=at+b$, and a steering angle may be defined as $y=\frac{1}{2}at^2+bt=c$. Here, t represents time.

When the angular acceleration, the angular velocity, and the steering angle are substituted for a loop number with respect to the time, the request command is generated in unit of 20 msec. Accordingly, these may be substituted for the loop number to generate the request command.

Therefore, when t is substituted for 0.02x=(1/50)x where t represents time and x represents count, the steering angle is expressed as:

$$y = \frac{1}{2}a\frac{1}{2500}x^2 + b\frac{1}{50}x + c.$$

Here, c represents an offset value of the request steering angle.

In short, the steering angle is expressed as $$y = \frac{3}{10}x^2 + \frac{b}{50}x + c.$$

When the steering angle is to be changed by 0.6 degree as x increases by 1, c becomes 0, and b becomes 15.

As such, the request command basic design function may be defined as follows. The increasing function of the steering angle is set to $$y(x) = \frac{3}{10}x^2 + \frac{3}{10}x + c,$$

and the decreasing function of the steering angle is set to $$y(x) = -\frac{3}{10}x^2 - \frac{3}{10}x + c.$$

The increasing function of the angular velocity is set to $$\dot{y}(x) = \frac{6}{10}\dot{x} + \frac{3}{10},$$

and the decreasing function of the angular velocity is set to $$\dot{y}(x) = -\frac{6}{10}\dot{x} - \frac{3}{10}.$$

Then, the request value generation unit 20 receives an initial steering angle from the steering angle sensor 35 at step S30.

Furthermore, the request value generation unit 20 sets a control period for center alignment according to the inputted steering angle at step S40.

At this time, the control period includes an angular velocity acceleration period, a constant angular velocity period, and an angular velocity deceleration period, and the angular velocity acceleration period and the angular velocity deceleration period are generated as the same request profile.

As shown in FIG. 3, the angular velocity acceleration period corresponds to a period where the count increases with respect to the time, the constant angular velocity period corresponds to a period where the count is maintained, and the angular velocity deceleration period corresponds to a period where the count decreases.

At this time, the request profile in the constant angular velocity period is generated as the maximum angular velocity, at step S50.

The maximum angular velocity is defined as $\dot{x}_{max}=12 \Rightarrow 375$ deg/s.

Furthermore, when the count is the maximum, the steering angle is defined as $x_{max}=12 \Rightarrow 46.8$ deg.

For example, when the initial steering angle inputted from the steering angle sensor 35 is 200 degrees, the period of the request profile for center alignment is determined by performing calculation for 100 degrees, because the angular acceleration period and the angular velocity deceleration period are symmetrical with each other at step S60.

Therefore, when 46.8 degrees are aligned by the angular velocity acceleration period or the angular velocity deceleration period, the rest 53.2 degrees are aligned in the constant angular velocity period.

Suppose that the steering angle is changed by 0.6 degree at an angular velocity of 30 deg/s. In this case, when the angular velocity is the maximum, the steering angle is 7.5 degrees, and seven loops are repeated for 53.2 degrees.

At this time, when seven loops are repeated by 7.5 degrees, the steering angle becomes 52.5 degrees. Therefore, as the steering angle is smaller by 0.7 degree than 53.2 degrees, a request profile where the loop is repeated one more time in one count period of the angular velocity acceleration period and the angular velocity deceleration period is generated to additionally drive 0.7 degree.

Furthermore, the rest 0.1 degree (=0.7−0.6) is used as a round down number.

In the above-described embodiment of the present invention, 0.1 degree is used as a round down number, and 20 ms and x=0.02 t are applied as the sampling time to reduce the round down number. However, when the sampling time is reduced, the round down number may be reduced.

According to the above-described method, the request value generation unit 20 generates a request command through the request profile.

In accordance with the embodiment of the present invention, the steering angle is detected after the vehicle having the MDPS mounted therein is parked, and the MDPS motor is controlled through the request command of the motor angular velocity for aligning the wheel with the center. Accordingly, the motor angular velocity of the motor which is actually driven is controlled to improve the precision of motor control, regardless of external disturbance such as tire frictions or loads.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for generating a request command of a wheel alignment apparatus using a motor-drive power steering (MDPS) comprising:
    setting, by a request value generation unit, an initial value of a request command basic design function, when an activation command is inputted according to an input of an activation switch;
    receiving an initial steering angle through a steering angle sensor after setting the initial value;
    setting a control period comprising an angular velocity acceleration period, a constant angular velocity period, and an angular velocity deceleration period from the initial steering angle, in order to align the wheel with the center, wherein the control period is set by the request value generation unit based on the initial steering angle; and
    generating a request profile according to the control period;
    wherein the request value generation unit is configured such that the angular velocity acceleration period and the angular velocity deceleration period are set to be the same.

2. The method of claim 1, wherein the request command profile in the constant angular velocity period is generated as the maximum angular velocity.

3. The method of claim 1, wherein the angular velocity acceleration period and the angular velocity deceleration period are generated as the same request command profile.

4. The method of claim 1, wherein, when a steering angle is insufficient in the angular velocity acceleration period and the angular velocity deceleration period, processing for loops of the control period is repeated.

5. The method of claim 1, wherein the request command basic design function is expressed with respect to loops of the control periods of a vehicle.

* * * * *